United States Patent Office 3,139,395
Patented June 30, 1964

3,139,395
PHOTODIMERIZATION OF FUMARIC ACID DERIVATIVES
Gary W. Griffin, New Haven, Conn., assignor to American Cyanamid Company, New York, N.Y., a corporation of Maine
No Drawing. Filed Jan. 9, 1961, Ser. No. 81,224
1 Claim. (Cl. 204—158)

This invention relates to a class of novel compounds selected from the group consisting of (A) cis, trans, cis-1,2,3,4-cyclobutanetetracarboxylic acid, (B) trans, trans, trans-1,2,3,4-cyclobutanetetracarboxylic acid, (C) the dianhydride of cis, trans, cis-1,2,3,4-cyclobutanetetracarboxylic acid, (D) the methyl esters of cis, trans, cis-1,2,3,4-cyclobutanetetracarboxylic acid, (E) the methyl esters of trans, trans, trans-1,2,3,4-cyclobutanetetracarboxylic acid, (F) cis, trans, cis-1,2,3,4-tetracyanocyclobutane. Still further this invention relates to the processes for the preparation of this class of novel compounds.

One of the objects of the present invention is to produce one or more compounds selected from the group consisting of (A) cis, trans, cis-1,2,3,4-cyclobutanetetracarboxylic acid, (B) trans, trans, trans-1,2,3,4-cyclobutanetetracarboxylic acid, (C) the dianhydride of cis, trans, cis-1,2,3,4-cyclobutanetetracarboxylic acid, (D) the methyl esters of cis, trans, cis-1,2,3,4-cyclobutanetetracarboxylic acid, (E) the methyl esters of trans, trans, trans-1,2,3,4-cyclobutanetetracarboxylic acid (F) cis, trans, cis-1,2,3,4-tetracyanocyclobutane. A further object of the present invention is to produce certain cyclobutanetetracarboxylic acids and their dianhydrides which are useful in the manufacture of alkyd resins, polyester resins and the like. These and other objects of the present invention will be discussed in greater detail hereinbelow.

In order to prepare the cis, trans, cis-1,2,3,4-cyclobutanetetracarboxylic acid, one demethylates the tetramethyl ester of the cis, trans, cis-1,2,3,4-cyclobutanetetracarboxylic acid. The demethylation of this tetramethyl ester may be accomplished by a plurality of known techniques including the acid hydrolysis of said tetramethyl ester. The tetramethyl ester of the cis, trans, cis-1,2,3,4-cyclobutanetetracarboxylic acid is produced by dimerizing dimethyl fumarate. This dimerization step is a novel one and has not previously been known in the prior art nor has any other process for the preparation of the cis, trans, cis tetramethyl ester been disclosed. The production of the tetramethyl ester of the cis, trans, cis-1,2,3,4-cyclobutanetetracarboxylic acid is accomplished by subjecting a solid state layer of dimethyl fumarate directly to light having a wave length between 1750 A. and 4000 A. The dimethyl fumarate may be dissolved in an appropriate solvent such as diethyl ether and a film of the solution of dimethyl fumarate is deposited in a comparatively thin layer on a supporting surface such as a glass plate or on the walls of a glass cylinder or tube and the solvent is then evaporated. The dimethyl fumarate is then in the form of a solid state layer and said layer is then exposed directly to light having a wave length between 1750 A. and 400 A. The light is applied directly to the solid state layer rather than through the glass support. It is not necessary to utilize glass as the supporting member for the solid state layer as other substrates could readily be utilized but it is preferred that the substrate be hard and substantially non-porous in order to facilitate the collection of the ultimate tetramethyl ester of said carboxylic acid produced.

The tetramethyl ester of trans, trans, trans-1,2,3,4-cyclobutanetetracarboxylic acid is produced by the thermal isomerization of the tetramethyl ester of the cis, trans, cis-1,2,3,4-cyclobutanetetracarboxylic acid. This thermal isomerization is accomplished by subjecting the cis, trans, cis compound to temperatures between about 200° C. and 400° C. in the absence of a reactive gas. Upon the production of the tetramethyl ester of the trans, trans, trans-1,2,3,4-cyclobutanetetracarboxylic acid one can convert said tetramethyl ester to the tetracarboxylic acid by a demethylation step such as that discussed briefly hereinabove to produce the trans, trans, trans-1,2,3,4-cyclobutanetetracarboxylic acid. The tetramethyl ester of trans, trans, trans-1,2,3,4-cyclobutanetetracarboxylic acid can be produced also by heating the tetramethyl ester of cis, trans, cis acid in the presence of sodium methoxide.

An additional feature of the present invention resides in the production of the dianhydride of the cis, trans, cis-1,2,3,4-cyclobutanetetracarboxylic acid which comprises the dehydration of the cis, trans, cis-1,2,3,4-cyclobutanetetracarboxylic acid. This dehydration is accomplished with chemical reagents such as acetyl chloride or acetic anhydride or by heating the cis, trans, cis-1,2,3,4-cyclobutanetetracarboxylic acid at temperatures in the vicinity of 225° C. where it rapidly loses water. The period of time required to convert the tetracarboxylic acid to the corresponding dianhydride varies inversely with the temperature selected for the dehydration step. At temperatures around 180° C. the interval for the dehydration may be as much as 24 hours or even longer. At the higher temperatures, however, the time for the dehydration step can be as little as one hour. An alternate process for the production of the dianhydride of the cis, trans, cis-1,2,3,4-cyclobutanetetracarboxylic acid can be utilized which comprises subjecting a solid state layer of maleic anhydride directly to light having a wave length between 1750 A. and 4000 A.

A further novel feature of the present invention resides in cis, trans, cis-1,2,3,4-tetracyanocylobutane and to the process of preparing the same. This is analogous to the process described hereinabove in the dimerization of maleic anhydride and dimethyl fumarate inasmuch as one can by this process dimerize fumaronitrile directly to light having a wave length between 1750 A. and 4000 A. to produce cis, trans, cis-1,2,3,4-tetracyanocyclobutane.

In the thermal isomerization of the tetramethyl ester of the cis, trans, cis-1,2,3,4-cyclobutanetetracarboxylic acid to the tetramethyl ester of the trans, trans, trans-1,2, 3,4-cyclobutanetetracarboxylic acid, one may utilize temperatures varying between about 200° C. and 400° C. and preferably at about 300° C. Again here, the time interval will vary inversely with the temperature. At the lower temperatures the time interval may be as much as 24 hours or more, whereas at the higher temperature the reaction time may be as little as one hour or less. Over exposure to the elevated temperatures in the thermal isomerization step should be avoided if darkening of the product is observed in the course of reaction. Essentially quantitative yields are experienced in this thermal isomerization reaction.

In order that the concept of the present invention may be more completely understood, the following examples are set forth in which all parts are parts by weight unless otherwise indicated. These examples are set forth primarily for the purpose of illustration and any specific enumeration of detail contained therein should not be interpreted as a limitation on the case except as is indicated in the appended claim.

EXAMPLE 1

A solution of dimethyl fumarate in methylene chloride is deposited on the inside wall of a glass cylinder. The methylene chloride is evaporated. A Westinghouse 15T8 Germicidal Sterilamp is inserted into the center of the glass cylinder and the outside of the cylinder is cooled with running water. The irradiation is continued for 24 hours and the resulting white solid is scraped from the tube and dissolved in hot benzene. The hot benzene solution is then admixed with activated charcoal and gravity filtered. The filtered solution is then allowed to cool slowly to room temperature, crystallizing therefrom the tetramethyl ester of cis, trans, cis-1,2,3,4-cyclobutanetetracarboxylic acid only. The original starting weight of the dimethyl fumarate was 11 parts and the yield of the tetramethyl ester is 6.5 parts representing a conversion of 59%. The tetramethyl ester of cis, trans, cis-1,2,3,4-cyclobutanetetracarboxylic acid is isolated and is determined to have a melting point of 144–145° C.

*Analysis.*—Cal. for $C_{12}H_{16}O_8$: C, 50.00; H, 5.60. Found: C, 50.28; H, 5.55.

*Molecular weight.*—Cal. for $C_{12}H_{16}O_8$: 288. Found (Rast): 263.

I.R. determined in KBr, 5.74µ (S), 5.80µ (M), 7.72µ (S), 8.33µ (M), 9.79µ (W), 10.55µ (W), 11.85µ (W), 12.21µ (W).

The nuclear magnetic resonance spectroscopy of the data are also in agreement with the assignment of the cis, trans, cis configuration. The spectrum determined in deuterochloroform shows only two types of protons in the expected ratio of 1:3 with the mass intense peak at $\tau$ equals 6.15 and the other $\tau$ equals 6.20. The position of the latter peak is consistent with the $CH_3$ proton of methyl acetate ($\tau$ equals 6.35). The lack of absorption in the region $\tau$ equals 3–4 attests to the absence of vinyl protons.

EXAMPLE 2

*Preparation of Cis, Trans, Cis-1,2,3,4-Tetracyanocyobutane*

60 parts of fumaronitrile are deposited on the inside wall of a glass cylinder by evaporating the solvent (diethyl ether) from the material. A Sterilamp as in Example 1 is placed in the center of the tube and the outside of the cylinder is cooled with running water. The irradiation is continued for about 1 week and the resulting product, a brown residue, is then scraped from the tube and extracted with hot ether to remove the starting material. The insoluble material amounting to 3.071 parts is recrystallized from dry acetonitrile yielding 2.1 parts (68% of converted nitrile, 3.5% over-all) of a white crystalline solid having a melting point of 250° C. dec. The product is identified as cis, trans, cis-1,2,3,4-tetracyanocyclobutane.

*Analysis.*—Cal. for $C_8H_4N_4$: C, 61.53; H, 2.58; N, 35.88. Found: C, 61.38; H, 2.79; N, 35.88.

The NMR spectrum shows only one peak, and the mass spectrograph does not show the parent mass, but shows a mass equivalent to that of the dimer less a molecule of HCN. The infrared spectrum is consistent with the dimeric structure as the carbon-hydrogen peak of fumaronitrile has been shifted from 3.27µ to 3.35µ in the dimer, and the nitrile peak has been shifted from 4.48µ to 4.44µ, which is compatible with the removal of unsaturation.

EXAMPLE 3

A solution containing 10 parts of maleic anhydride is coated on the inner surface of a glass tube and dried by evaporating the solvent (diethyl ether). The ultraviolet light source was inserted into this tube and irradiation was continued for a period of 10 days. After this, the solid is scraped from the tube and sublimed at .01 mm. The sublimate was collected up to 160° C. and was assumed to be maleic anhydride and was discarded. The dianhydride however sublimed at about 200° C. at 0.01 mm. and weighed 0.9 grams. The product did not melt at 300° C. but simply sublimed. Its IR spectrum shows the characteristic unconjugated anhydride doublet at 5.40 and 5.62µ, indicating that it is one of the bis-anhydrides of 1,2,3,4-cyclobutanetetracarboxylic acid (anhydride doublet of cis, cis-3-methylcyclobutane-1,2-dicarboxylic acid at 5.41 and 5.63µ.

EXAMPLE 4

A quantity of the tetramethyl ester of cis, trans, cis-1,2-3-4-cyclobutanetetracarboxylic acid prepared according to the process of Example 1 is thermally isomerized by heating the sample at 300° C. in a vacuum or in an inert gas for about 24 hours. The resulting product, purified by sublimation at 80° C. and 0.1 mm. pressure, is identified as the tetramethyl ester of trans, trans, trans-1,2,3,4-cyclobutanetetracarboxylic acid, which had a melting point of 123–125° C.

EXAMPLE 5

A dispersion containing 11 parts of the tetramethyl ester of cis, trans, cis-1,2,3,4-cyclobutanetetracarboxylic and 180 parts of concentrated hydrochloric acid is heated on a steam both until the mixture becomes homogeneous and heating is then continued for an additional hour. The solution is then evaporated to dryness and the residual solid is identified as cis, trans, cis-1,2,3,4-cyclobutanetetracarboxylic acid.

EXAMPLE 6

The tetramethyl ester of trans, trans, trans-1,2,3,4-cyclobutanetetracarboxylic acid prepared according to the process of Example 4 is subjected to acid hydrolysis according to the process in Example 5. The resulting acid is isolated and identified as the trans, trans, trans-1,2,3,4-cyclobutanetetracarboxylic acid.

It has been mentioned hereinabove that the tetracarboxylic acids and their anhydrides of the present invention may be used in the manufacture of alkyd and polyester resins by reacting the same with a polyhydric alcohol such as glycerol in the case of alkyd resins or a glycol such as ethylene glycol in the case of polyester resins. These alkyds may also be modified by replacing part of the polyols with monohydric alcohols. The methyl esters of these tetracarboxylic acids can be utilized for the same purposes especially where transesterification between the methyl esters and the polyhydric alcohol is desired. The tetracyano derivatives are useful in the production of guanamines by reacting said tetracyano compound with dicyandiamide. The guanamines thus produced are reactive with aldehydes such as formaldehyde to produce aminoplast resinous compositions.

I claim:

A process for the preparation of the tetramethyl ester of cis, trans, cis-1,2,3,4-cyclobutane tetracarboxylic acid comprising dimerizing dimethyl fumarate by subjecting a solid state layer of dimethyl fumarate directly to light having a wave length between about 1750 A. and 4000 A.

References Cited in the file of this patent

Reid et al.: "J. Am. Chem. Soc.," vol 73, pages 1985–8, May 1951.

Griffin et al.: "Tetrahedron Letters," No. 3, pages 13–16 (1960).

Criegee et al.: "Ber. Deut. Chem.," vol. 93 (1960), pages 2521–2524.